(12) United States Patent
Zhou et al.

(10) Patent No.: US 11,520,982 B2
(45) Date of Patent: Dec. 6, 2022

(54) GENERATING CORPUS FOR TRAINING AND VALIDATING MACHINE LEARNING MODEL FOR NATURAL LANGUAGE PROCESSING

(71) Applicant: SAP SE, Walldorf (DE)

(72) Inventors: Keguo Zhou, Shanghai (CN); Jiyuan Zhan, Shanghai (CN); Liangqi Xiong, Shanghai (CN)

(73) Assignee: SAP SE, Walldorf (DE)

( * ) Notice: Subject to any disclaimer, the term of this patent is extended or adjusted under 35 U.S.C. 154(b) by 515 days.

(21) Appl. No.: 16/586,374

(22) Filed: Sep. 27, 2019

(65) Prior Publication Data
US 2021/0097136 A1 Apr. 1, 2021

(51) Int. Cl.
*G06F 40/211* (2020.01)
*G06K 9/62* (2022.01)
*G06N 3/02* (2006.01)
*G06N 20/10* (2019.01)

(52) U.S. Cl.
CPC .......... *G06F 40/211* (2020.01); *G06K 9/6297* (2013.01); *G06N 3/02* (2013.01); *G06N 20/10* (2019.01)

(58) Field of Classification Search
CPC ........ G06F 40/211; G06F 40/30; G06F 8/427; G06N 20/10; G06N 3/02; G06N 7/005; G06N 5/047; G06N 3/08; G06K 9/6297
See application file for complete search history.

(56) References Cited

U.S. PATENT DOCUMENTS

| | | | |
|---|---|---|---|
| 8,996,555 B2 | 3/2015 | Kuchmann-Beauger et al. | |
| 9,213,771 B2 | 12/2015 | Chen et al. | |
| 9,378,285 B2 | 6/2016 | Marchisio et al. | |
| 10,169,703 B2 | 1/2019 | Allen et al. | |
| 2012/0041753 A1* | 2/2012 | Dymetman | G06F 40/289 704/4 |
| 2018/0300317 A1* | 10/2018 | Bradbury | G06F 40/211 |

(Continued)

FOREIGN PATENT DOCUMENTS

| | | |
|---|---|---|
| CN | 1936885 A | 3/2007 |
| CN | 101446942 A | 6/2009 |

OTHER PUBLICATIONS

Bansal, S., "Language Modelling and Text Generation using LSTMs—Deep Learning for NLP," https://medium.eom/@shivambansal36/language-modelling-text-generation-using-lstms-deep-learning-for-npl-ed36b224b275, Mar. 26, 2018, (7 pages).

*Primary Examiner* — Michael Colucci
(74) *Attorney, Agent, or Firm* — Mintz Levin Cohn Ferris Glovsky and Popeo, P.C.

(57) ABSTRACT

A method may include generating, based a context-free grammar, a sample forming a corpus. The context-free grammar may include production rules for replacing a first nonterminal symbol with a second nonterminal symbol and/or a terminal symbol. The sample may be generated by rewriting recursively a first text string to form a second text string associated with the sample. The first text string may be rewritten by applying the production rules to replace nonterminal symbols included in the first text string until no nonterminal symbols remain in the first text string. A machine learning model may be trained, based on the corpus, to process a natural language. Related methods and articles of manufacture are also disclosed.

19 Claims, 8 Drawing Sheets

(56) References Cited

U.S. PATENT DOCUMENTS

| | | | |
|---|---|---|---|
| 2019/0108282 A1* | 4/2019 | Zeng | G06N 5/022 |
| 2019/0258461 A1* | 8/2019 | Li | G06F 40/237 |
| 2021/0064822 A1* | 3/2021 | Velikovich | G06F 40/295 |
| 2021/0275918 A1* | 9/2021 | Devaranjan | G06T 17/00 |

* cited by examiner

GENERATING CORPUS FOR TRAINING AND VALIDATING MACHINE LEARNING MODEL FOR NATURAL LANGUAGE PROCESSING

FIELD

The present disclosure generally relates to machine learning and more specifically to training and validating a machine learning model for natural language processing.

BACKGROUND

Machine learning models may be trained to perform a variety of cognitive tasks. For example, a machine learning model trained to perform natural language processing may classify text by at least assigning, to the text, one or more labels indicating a sentiment, a topic, and/or an intent associated with the text. Training the machine learning model to perform natural language processing may include adjusting the machine learning model to minimize the errors present in the output of the machine learning model. For instance, training the machine learning model may include adjusting the weights applied by the machine learning model in order to minimize a quantity of incorrect labels assigned by the machine learning model.

SUMMARY

Methods, systems, and articles of manufacture, including computer program products, are provided for training a machine learning model for natural language processing. In one aspect, there is provided a system. The system may include at least one data processor and at least one memory. The at least one memory may store instructions that result in operations when executed by the at least one data processor. The operations may include: generating, based at least on a context-free grammar, a sample forming a corpus, the context-free grammar including one or more production rules for replacing a first nonterminal symbol with a second nonterminal symbol and/or a terminal symbol, the sample being generated by at least rewriting recursively a first text string to form a second text string associated with the sample, and the first text string being rewritten by at least applying the one or more production rules to replace one or more nonterminal symbols included in the first text string until no nonterminal symbols remain in the first text string; and training and validating, based at least on the corpus, a machine learning model to process a natural language.

In some variations, one or more of the features disclosed herein including the following features can optionally be included in any feasible combination. The context-free grammar may include a first production rule for replacing the first nonterminal symbol with at least the second nonterminal symbol. The context-free grammar may further include a second production rule for replacing the second nonterminal symbol with at least the terminal symbol. The first text string may be rewritten recursively by at least applying the first production rule to replace the first nonterminal symbol included in the first text string with the second nonterminal symbol before applying the second production rule to replace the second nonterminal symbol with the terminal symbol.

In some variations, the generating of the corpus may further include assigning, to the sample, a ground-truth label for the second text string associated with the sample. The ground-truth label may indicate a sentiment, a topic, and/or an intent associated with the second text string. The ground-truth label may be associated with a first value based on the terminal symbol being an entity having a semantic significance. The ground-truth label may be associated with a second value based on the terminal symbol being a nonentity having no semantic significance.

In some variations, the ground-truth label may be associated with a value corresponding to an application of the machine learning model trained to process the natural language.

In some variations, the machine learning model may be trained by at least adjusting one or more weights applied by the machine learning model to at least minimize an error in an output of the machine learning model. The error in the output of the machine learning model may correspond to a difference between the ground-truth label assigned to the sample and a label assigned to the sample by the machine learning model.

In some variations, the machine learning model may be validated based at least on the machine learning model assigning, to the sample, a label matching the ground-truth label associated with the sample.

In some variations, the context-free grammar may be defined based at least on a text associated with the natural language. The context-free grammar may be defined by at least determining a hierarchy including a first plurality of layers having a first plurality of members forming a first set of nonterminal symbols including the first nonterminal symbol and the second nonterminal symbol. The hierarchy may further include a second plurality of layers having a second plurality of members forming a second set of terminal symbols including the terminal symbol.

In some variations, the context-free grammar may be defined by at least determining, based at least on one or more directed edges interconnecting the first plurality of members and the second plurality of members, the one or more production rules.

In some variations, the context-free grammar may be defined by at least determining, based at least on the first plurality of members, the first set of nonterminal symbols. The context-free grammar may be further defined by at least determining, based at least on the second plurality of members, the second set of terminal symbols.

In some variations, the first plurality of layers may include a pattern layer including a pattern present in the text and an entity cluster layer including a cluster of a first entity and a second entity present in the subpattern. The second plurality of layers may include a padding layer including a nonentity present in the subpattern, an entity layer including the first entity and the second entity, and a synonym layer including a synonym associated with the first entity and/or the second entity.

In some variations, the machine learning model may be a neural network, a Bayesian network, a Markov chain, and/or a support vector machine.

In some variations, each of the first nonterminal symbol and the second nonterminal symbol may denote a noun phrase, a verb phrase, an adjective phrase, an adverb phrase, a Gerund phrase, an infinitive phrase, an absolute phrase, a determiner, a conjunction, a verb, a noun, a pronoun, an adjective, an adverb, a preposition, or an interjection.

In some variations, the terminal symbol may denote a word in a lexicon associated with the natural language.

In some variations, the sample may be part of a training dataset or a validation dataset forming the corpus.

In another aspect, there is provided a method for training a machine learning model for natural language processing.

generating, based at least on a context-free grammar, a sample forming a corpus, the context-free grammar including one or more production rules for replacing a first nonterminal symbol with a second nonterminal symbol and/or a terminal symbol, the sample being generated by at least rewriting recursively a first text string to form a second text string associated with the sample, and the first text string being rewritten by at least applying the one or more production rules to replace one or more nonterminal symbols included in the first text string until no nonterminal symbols remain in the first text string; and training and validating, based at least on the corpus, a machine learning model to process a natural language.

In another aspect, there is provided a computer program product that includes a non-transitory computer readable storage medium. The non-transitory computer-readable storage medium may include program code that causes operations when executed by at least one data processor. The operations may include: generating, based at least on a context-free grammar, a sample forming a corpus, the context-free grammar including one or more production rules for replacing a first nonterminal symbol with a second nonterminal symbol and/or a terminal symbol, the sample being generated by at least rewriting recursively a first text string to form a second text string associated with the sample, and the first text string being rewritten by at least applying the one or more production rules to replace one or more nonterminal symbols included in the first text string until no nonterminal symbols remain in the first text string; and training and validating, based at least on the corpus, a machine learning model to process a natural language.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to training a machine learning model for natural language processing, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Like labels are used to refer to same or similar items in the drawings.

DETAILED DESCRIPTION

A machine learning model may be trained to perform natural language processing by at least subjecting the machine learning model to supervised learning. Supervised learning may require labeled corpus, which may include training samples as well as validation samples of text associated with at least one ground-truth label that correspond to a correct label for the text. Training the machine learning model may thus include minimizing an error in an output of the machine learning model, which may correspond to a difference between the labels the machine learning model assigns to a sample and the ground-truth label associated with the sample. Furthermore, the performance of the machine learning model may be validated based on the machine learning model assigning a correct label to more than a threshold catheterization quantity of validation samples.

Training the machine learning model for optimal performance may require a large corpus with diverse and uniformly distributed samples. As used here, a "corpus" may refer to a collection of samples and validation samples. Moreover, training the machine learning model to perform optimally for a specific natural language processing application may require an application-specific corpus. However, collecting a large, application-specific corpus with diverse and uniformly distributed samples may require tremendous resources. As such, in some example embodiments, a machine learning controller may be configured to generate, based on a context-free grammar, a labeled corpus for processing a natural language. For example, the machine learning controller may generate the corpus by at least generating, based on the context-free grammar, one or more samples. By applying the context-free grammar, the machine learning controller may generate a large, application-specific corpus with diverse and uniformly distributed samples with minimal resources.

In some example embodiments, the machine learning controller may generate a sample (e.g., a sample or a validation sample) by at least recursively rewriting, based on the context-free grammar, a first text string to form a second text string. The context-free grammar may be defined in accordance with the grammar of the natural language, which may include structural rules governing the composition of clauses, phrases, and/or words in the natural language. For instance, the context-free grammar may include a set of production rules for rewriting the first text string that includes a sequence of nonterminal symbols and/or terminal symbols. Each of the nonterminal symbols include in the first text string may be replaced, in accordance with one or more production rules, with one or more nonterminal symbols and/or terminal symbols. A nonterminal symbol may denote, for example, a noun phrase, a verb phrase, an adjective phrase, an adverb phrase, a Gerund phrase, an infinitive phrase, an absolute phrase, a determiner, a conjunction, a verb, a noun, a pronoun, an adjective, an adverb, a preposition, an interjection, and/or the like. By contrast, a terminal symbol may be a word from the lexicon of the natural language that cannot be further replaced based on any of the production rules. In order to form the second text string, the machine learning controller may apply the set of production rules to recursively replace the nonterminal symbols included the first text string with other nonterminal symbols and/or terminal symbols until only terminal symbols remain in the first text string. The resulting second text string may include a sequence of terminal symbols consistent with the grammar of the natural language.

In some example embodiments, the machine learning controller may further generate the sample by at least assigning, to the sample, one or more ground-truth labels corresponding to the correct labels for the second text string associated with the sample. As noted, the second text string may include a sequence of terminal symbols corresponding to words in the lexicon of the natural language. The ground-truth labels may be assigned based at least on the terminal symbols included in the second text string. For example, the machine learning controller may assign, based on one or more of the terminal symbols included in the second text string, one or more labels indicating a sentiment, a topic, and/or an intent associated with the second text string. It should be appreciated that the one or more labels assigned to the sample may be specific to the natural language processing application of the machine learning model. For instance, the machine learning model deployed as part of a service ticket system to identify the issues reported to the service ticket system may be associated with a different set of labels than the machine learning model deployed as part of a document management system to categorize documents for storage.

Figure 1:
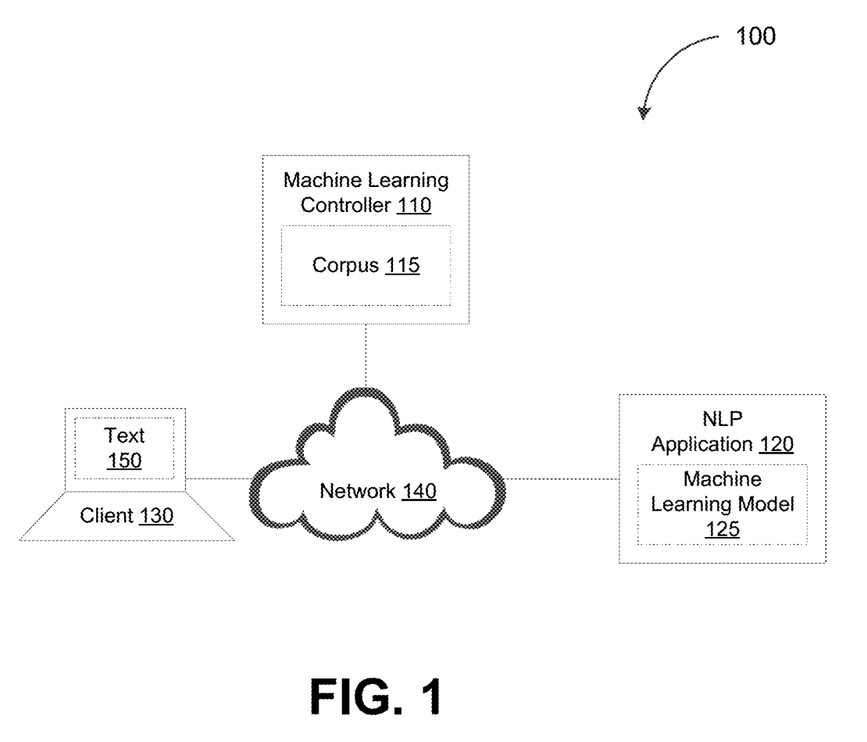
FIG. 1 depicts a network diagram illustrating a machine learning enabled natural language process system, in accordance with some example embodiments.

FIG. 1 depicts a system diagram illustrating an example of a machine learning enabled natural language processing system 100, in accordance with some example embodiments. Referring to FIG. 1, the machine learning enabled natural language processing system 100 may include a machine learning controller 110, a natural language processing application 120, and a client 130. The machine learning controller 110, the natural language processing application 120, and the client 103 may be communicatively coupled via a network 140. It should be appreciated that the client 130 may be any processor-based device including, for example, a smartphone, a tablet computer, a wearable apparatus, a virtual assistant, an Internet-of-Things (IoT) appliance, and/or the like. The network 140 may be any wired network and/or a wireless network including, for example, a wide area network (WAN), a local area network (LAN), a virtual local area network (VLAN), a public land mobile network (PLMN), the Internet, and/or the like.

In some example embodiments, the machine learning controller 110 may be configured to generate a corpus 115 for training and validating a machine learning model 125 to perform natural language processing including by classify a text 150 received from the client 130. The machine learning model 125 may be any type of machine learning model including, for example, a neural network, a Markov chain, a support vector machine, a Bayesian network, and/or the like. The corpus 115 may include a training dataset for training the machine learning model 125 as well as a validation dataset for validating a performance of the machine learning model 125.

For example, the machine learning model 125 may be trained to classify the text 150 by at least assigning, to the text 150, one or more labels indicating a sentiment, a topic, and/or an intent of the text 150. However, the machine learning model 125 may output one or more incorrect labels inconsistent with the ground-truth labels associated with the text 150. As such, training the machine learning model 125 may include determining a gradient of an error function (e.g., mean squared error (MSE), cross entropy, and/or the like) associated with the machine learning model 125. Furthermore, training the machine learning model 125 may include adjusting one or more weights applied by the machine learning model 125 until the gradient of the error function converges to a threshold value (e.g., a local minimum and/or the like).

The machine learning controller 110 may generate the corpus 115 by at least generating one or more samples, each of which including a text string and one or more ground-truth labels for the text string. For example, a single sample may include a text string and at least one ground-truth label indicative of a sentiment, a topic, and/or an intent associated with the text string. The machine learning model 125 may be trained to at least minimize an error in the output of the machine learning model 125. The error in the output of the machine learning model 125 may correspond to a difference between the label that the machine learning model 125 assigns to a sample and the ground-truth label associated with the sample. Alternatively and/or additionally, the performance of the machine learning model 125 may be validated, subsequent to training, based at least on the machine learning model 125 assigning, to more than a threshold quantity of samples, labels matching the ground-truth labels associated with the samples.

In some example embodiments, the machine learning controller 110 may generate a sample by at least recursively rewriting, based on a context-free grammar of a natural language, a first text string to form a second text string. The context-free grammar may describe every possible text strings within the natural language by at least enumerating a set of production rules for rewriting the first text string including the sequence of nonterminal symbols and/or terminal symbols to form the second text string including the sequence of terminal symbols. Moreover, the context-free grammar may be defined in accordance with the grammar of the natural language, which may include structural rules governing the composition of clauses, phrases, and/or words in the natural language. Accordingly, applying the context-free grammar to rewrite the first text string may ensure that the resulting second text string is consistent with the grammar of the natural language.

In some example embodiments, the machine learning controller 110 may apply the context-free grammar G, which may be expressed as the following quaternion.

$$G=(N, \Sigma, T, S)$$

wherein N may denote a finite set of nonterminal symbols N={S, $n_1$, $n_2$, $n_3$, ..., $n_8$}, $\Sigma$ may denote a finite set of terminal symbols $\Sigma=\{249_1, \varepsilon_2, \varepsilon_3, ..., \varepsilon_7\}$, T may denote a finite set of production rules T={$\alpha \rightarrow b$} in which $\alpha \in N$, $b \in (N \cup \Sigma)^*$, * may denote a Kleene closure in which b may be a single element (e.g., $n_1$) or a sequence of multiple elements (e.g., $n_1$, $n_2$, $n_3$), and $\forall \alpha \in N$, $\exists b\ 531\ (N \cup \Sigma)$ satisfies $\alpha \rightarrow b \in T$, and S may denote the start symbol from the set of nonterminal symbols N (e.g., $S \in N$).

Figure 2:
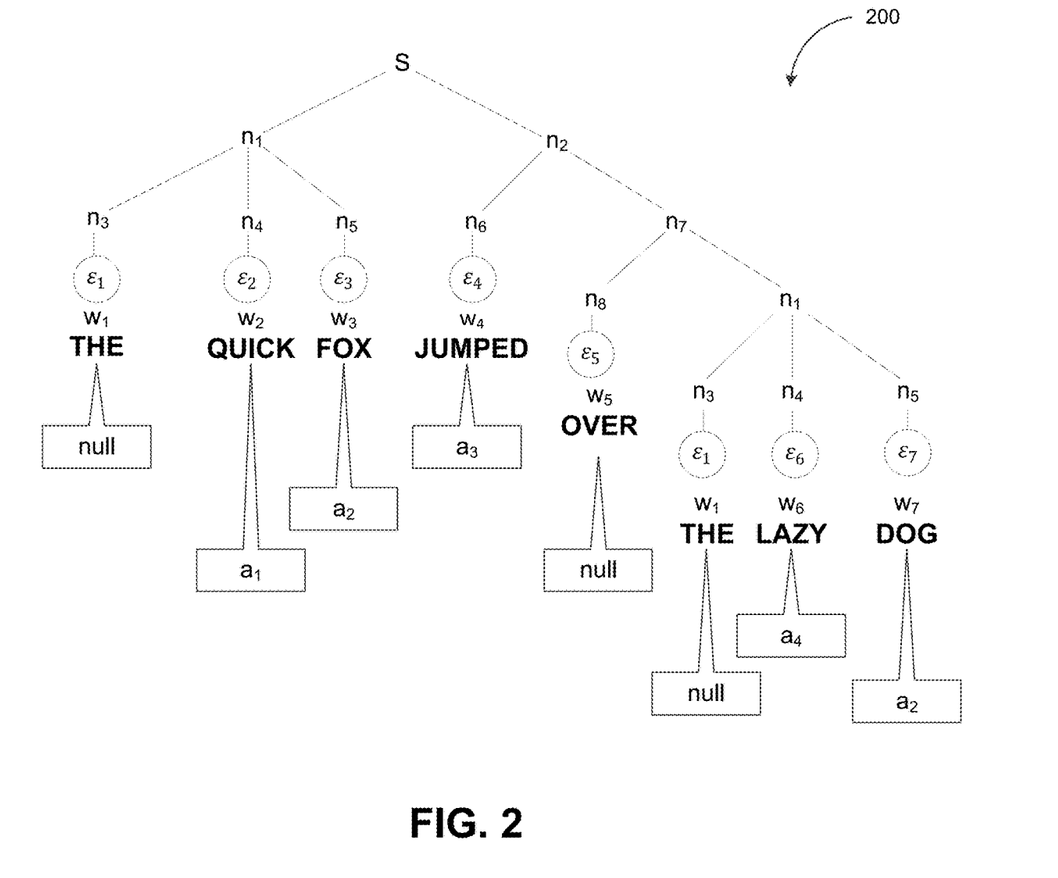
FIG. 2 depicts a parse tree illustrating an example of applying one or more production rules to rewrite a first text string to form a second text string, in accordance with some example embodiments.

To further illustrate, FIG. 2 depicts a parse tree 200 illustrating an example of applying one or more production rules to rewrite a first text string to form a second text string, in accordance with some example embodiments. In the example shown in FIG. 2, the machine learning controller 110 may apply the set of production rules T={$S \rightarrow n_1 n_2$, $n_1 \rightarrow n_3 n_4 n_5$, $n_2 \rightarrow n_6 n_7$, $n_7 \rightarrow n_8 n_1$, $n_3 \rightarrow \varepsilon_1$, $n_4 \rightarrow \varepsilon_2$, $n_5 \rightarrow \varepsilon_3$, $n_6 \rightarrow \varepsilon_4$, $n_8 \rightarrow \varepsilon_5$, $n_{11} \rightarrow \varepsilon_6$, $n_{12} \rightarrow \varepsilon_7$} to rewrite the first text string.

As shown in FIG. 2, the machine learning controller 110 may apply the first production rule $S \rightarrow n_1 n_2$ to replace the start symbol S with a first nonterminal symbol $n_1$ corresponding to a noun phrase and a second nonterminal symbol $n_2$ corresponding to a verb phrase. The machine learning controller 110 may apply the second production rule $n_1 \rightarrow n_3 n_4 n_5$ to further replace the first nonterminal symbol $n_1$ with a third nonterminal symbol $n_3$ corresponding to a determiner, a fourth nonterminal symbol $n_4$ corresponding to an adjective, and a fifth nonterminal symbol $n_5$ corresponding to a noun. The machine learning controller 110 may also apply the third production rule $n_2 \rightarrow n_6 n_7$ to replace the second nonterminal symbol $n_2$ with a sixth nonterminal symbol $n_6$ corresponding to a verb and a seventh nonterminal symbol $n_7$ corresponding to a prepositional phrase. Applying the fourth production rule $n_7 \rightarrow n_8 n_1$, the machine learning controller 110 may replace the seventh nonterminal symbol $n_7$ with an eighth nonterminal symbol $n_8$ corresponding to a preposition and the first nonterminal symbol $n_1$ corresponding to a noun phrase.

Applying the remaining production rules, the machine learning controller 110 may successively replace each of the third nonterminal symbol $n_3$, the fourth nonterminal symbol $n_4$, the fifth nonterminal symbol $n_5$, the sixth nonterminal symbol $n_6$, and the eighth nonterminal symbol $n_8$ remaining in the first text string with the corresponding terminal symbols including, as shown in FIG. 2, a first terminal symbol $\varepsilon_1$ corresponding to a first word $w_1$, a second terminal symbol $\varepsilon_2$ corresponding to a second word $w_2$, a third terminal symbol $\varepsilon_3$ corresponding to a third word $w_3$, a fourth terminal symbol $\varepsilon_4$ corresponding to a fourth word $w_4$, a fifth terminal symbol $\varepsilon_5$ corresponding to a fifth word $w_5$, a sixth terminal symbol $\varepsilon_6$ corresponding to a sixth word $w_6$, and a seventh terminal symbol $\varepsilon_7$ corresponding to a seventh word $w_7$. The first word $w_1$, the second word $w_2$, the third word $w_3$, the fourth word $w_4$, the fifth word $w_5$, the sixth word $w_6$, and the seventh word $w_7$ may part of the lexicon of the natural language. Moreover, in the example shown in FIG. 2, the machine learning controller 110 may apply the set of production rules T to rewrite the first text string to form the second text string $w_1 w_2 w_3 w_4 w_5 w_1 w_6 w_7$ corresponding to the sentence "the quick fox jumped over the lazy dog."

In some example embodiments, the machine learning controller 110 may further generate the sample to include one or more ground-truth labels for the corresponding second text string. For example, the machine learning controller 110 may assign, to the second text string, one or more labels from a label set A. The label set A may be specific to the natural language processing application 120. For instance, the label set A may include one or more different labels if the machine learning model 125 is deployed as part of a service ticket system to identify the issues reported to the service ticket system than if the machine learning model 125 is deployed as part of a document management system to categorize documents for storage.

In some example embodiments, the machine learning controller 110 may apply a mapping function $f:\Sigma \rightarrow A$ in order to assign, to the second text string, one or more labels from the label set A. The mapping function $f$ may assign, to each terminal symbol $\varepsilon \in \Sigma$ included in the second text string, a corresponding label from the label set A. Accordingly, for every sequence of words $w=(w_1, w_2, w_n)$, the machine learning controller 110 may determine a corresponding sequence of labels a expressed as Equation (1) below.

$$\alpha=(f(w_1), f(w_2), \ldots, f(w_n))=(f(\varepsilon_1), f(\varepsilon_2), \ldots, f(\varepsilon_n))=(\alpha_1, \alpha_2, \ldots, \alpha_n), \alpha_1 \in A \quad (1)$$

As noted, the machine learning controller 110 may generate the second text string to include a sequence of terminal symbols, each of which corresponding to a word from the lexicon of the natural language. Some of the terminal symbols include in the second text string may be may be entities having semantic significance while other terminal symbols included in the second text string may be nonentities having no semantic significance. In some example embodiments, the machine learning controller 110 may assign, to each terminal symbol that corresponds to a nonentity, a "null" label. Table 1 below depicts an example of the mapping function $f$, which the machine learning controller 110 may apply to determine one or more ground-truth labels for the example of the second text string shown in FIG. 2.

TABLE 1

| $\varepsilon$ | $f(\varepsilon)$ |
|---|---|
| $\varepsilon_1$ | null |
| $\varepsilon_2$ | $\alpha_1$ |
| $\varepsilon_3$ | $\alpha_2$ |
| $\varepsilon_4$ | $\alpha_3$ |
| $\varepsilon_5$ | null |
| $\varepsilon_6$ | $\alpha_4$ |
| $\varepsilon_7$ | $\alpha_2$ |

In some example embodiments, the machine learning controller 110 may define the context-free grammar G to maximize the diversity and uniformity of the samples included in the corpus 115 generated based on the context-free grammar G. For example, the machine learning controller 110 may define the context-free grammar G in accordance with the grammar of the natural language, which may include structural rules governing the composition of clauses, phrases, and/or words in the natural language. Moreover, the context-free grammar G may be defined based on text encountered by the natural language processing application 120. For instance, the machine learning controller 110 may define the context-free grammar G based on the text included in the reports submitted to a service ticket system or the documents stored in a document storage system.

Figure 3A:
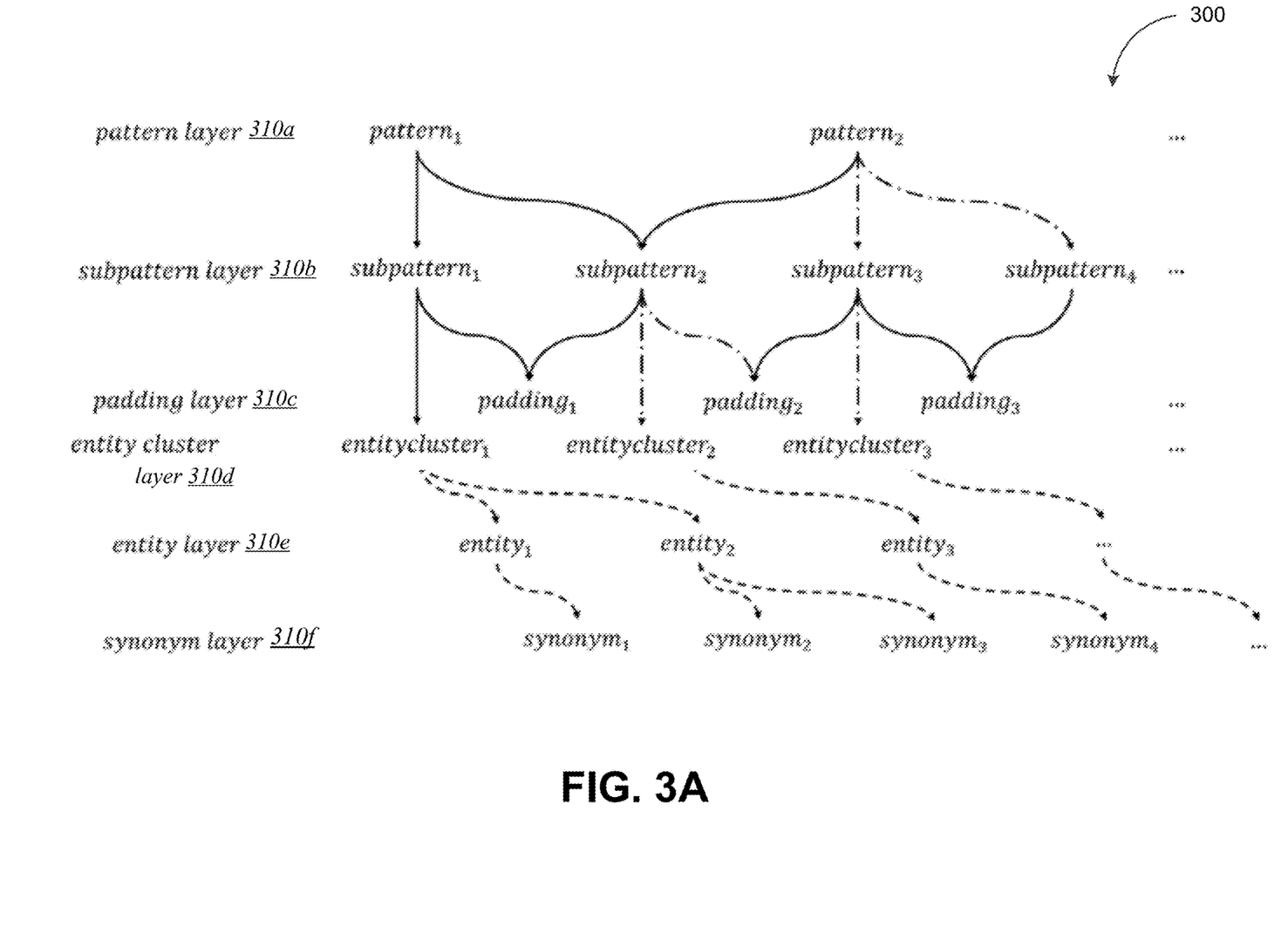
FIG. 3A depicts an example of a hierarchy associated with a context-free grammar, in accordance with some example embodiments.

To define the context-free grammar G, the machine learning controller 110 may generate, based at least on the text encountered by the natural language processing application 120, a hierarchy associated with the context-free grammar G. FIG. 3A depicts an example of a hierarchy 300 associated with the context-free grammar G, in accordance with some example embodiments. Referring to FIG. 3, the hierarchy 300 of the context-free grammar G may include a plurality of layers including, for example, a pattern layer 310a, a subpattern layer 310b, a padding layer 310c, an entity cluster layer 310d, an entity layer 310e, and a synonym layer 310f.

As shown in FIG. 3A, the pattern layer 310a may include a plurality of patterns including, for example, a first pattern $pattern_1$ and a second pattern $pattern_2$. For example, the first pattern $pattern_1$ and the second pattern $pattern_2$ may each be a sentence encountered by the natural language processing application 120. Meanwhile, the subpattern layer 310b may include a plurality of subpatterns present in the patterns included in the pattern layer 310a. For example, FIG. 3A shows the first pattern $pattern_1$ as including a first subpattern $subpattern_1$ and a second subpattern $subpattern_2$. As shown in FIG. 3A, the second subpattern $subpattern_2$ may also be present in the second pattern $pattern_2$ along with a third subpattern $subpattern_3$ and a fourth subpattern $subpattern_4$. Each of the first subpattern $subpattern_1$, the second subpattern $subpattern_2$, the third subpattern $subpattern_3$, and the fourth subpattern $subpattern_4$ may be a clause or a phrase.

Referring again to FIG. 3A, the first subpattern $subpattern_1$, the second subpattern $subpattern_2$, the third subpattern $subpattern_3$, and the fourth subpattern $subpattern_4$ may each include one or more paddings occupying the padding layer 310c and/or entity clusters occupying the entity cluster layer 310d. Each entity cluster may include one or more entities occupying the entity layer 310e. As noted, an entity may correspond to a nonterminal symbol (e.g., words from the lexicon of the natural language) having semantic significance. By contrast, each padding may correspond to a nonentity without any semantic significance. In the example shown in FIG. 3A, the first subpattern $subpattern_1$ may include a first entity cluster $entitycluster_1$ and a first padding $padding_1$ while the second subpattern $subpattern_2$ may include a second entity cluster $entitycluster_2$, the first padding $padding_1$, and the second padding $padding_2$.

As noted, each entity cluster may include one or more entities which, as noted, may correspond to one or more nonterminal symbols (e.g., words from the lexicon of the natural language) having semantic significance. For example, as shown in FIG. 3A, the first entity cluster $entitycluster_1$ may include a first entity $entity_1$ and a second entity $entity_2$ while the second entity cluster $entitycluster_2$ may include a third entity $entity_3$. As FIG. 3A further shows, each entity may be associated with one or more synonyms having a similar and/or same semantic significance as the entity. For instance, the first entity $entity_1$ may be associated with a first synonym $synonym_1$ whereas the second entity $entity_2$ may be associated with a second synonym $synonym_2$ and a third synonym $synonym_3$. The first synonym $synonym_5$, the second synonym $synonym_2$, and the third synonym $synonym_3$ may occupy the synonym layer 310f of the hierarchy 300.

In some example embodiments, the machine learning controller 110 may generate, based at least on the hierarchy 300, the context-free grammar G including the set of nonterminal symbols N, the set of terminal symbols E, and the set of production rules T. For example, the members of the padding layer 310c, the entity layer 310e, and the synonym layer 310f may form the set of terminal symbols Σ while the members of the pattern layer 310a, the subpattern layer 310b, and the entity cluster layer 310d may form the set of nonterminal symbols N. Accordingly, the machine learning controller 110 may generate, based at least on the pattern layer 310a, the subpattern layer 310b, and the entity cluster layer 310d of the hierarchy 300, the set of nonterminal symbols N. The machine learning controller 110 may further generate, based at least on the padding layer 310c, the entity layer 310e, and the synonym layer 310f of the hierarchy 300, the set of terminal symbols E.

Referring again to FIG. 3A, the hierarchy 300 may include a plurality of directed edges, each of which corresponding to a production rule for replacing a member occupying one layer of the hierarchy 300 with one or more members occupying another layer of the hierarchy 300. For example, the machine learning controller 110 may generate, based at least on the first directed edge from the first pattern $pattern_1$ to the first subpattern $subpattern_1$, a first production rule for replacing the first pattern $pattern_1$ with the first subpattern $subpattern_1$ and the second subpattern $subpattern_2$. The machine learning controller 110 may also generate, based at least on the second directed edge from the first subpattern $subpattern_1$ to the first entity cluster $entitycluster_1$, a second production rule for replacing the first subpattern $subpattern_1$ with the first entity cluster $entitycluster_1$. Furthermore, the machine learning controller 110 may generate, based at least on the third directed edge from the first entity cluster $entitycluster_1$ to the first entity $entity_1$, a third production rule for replacing the first entity cluster $entitycluster_1$ with the first entity $entity_1$. The machine learning controller 110 may further generate, based at least on the fourth directed edge from the first entity $entity_1$ to the first synonym $synonym_5$, a fourth production rule for replacing the first entity $entity_1$ with the first synonym $synonym_1$.

The hierarchy 300 depicted in FIG. 3A may be a linear hierarchical structure in which the members of one layer in the hierarchy 300 may be connected directly to the members of successive layers in the hierarchy 300. However, it should be appreciated that the context-free grammar G may also be associated with a nonlinear hierarchical structure. Moreover, although FIG. 3A depicts the hierarchy 300 as including a single pattern layer 310a and a single subpattern layer 310b, it should be appreciated that the hierarchy 300 may include multiple pattern layers and/or subpattern layers.

Figure 3B:
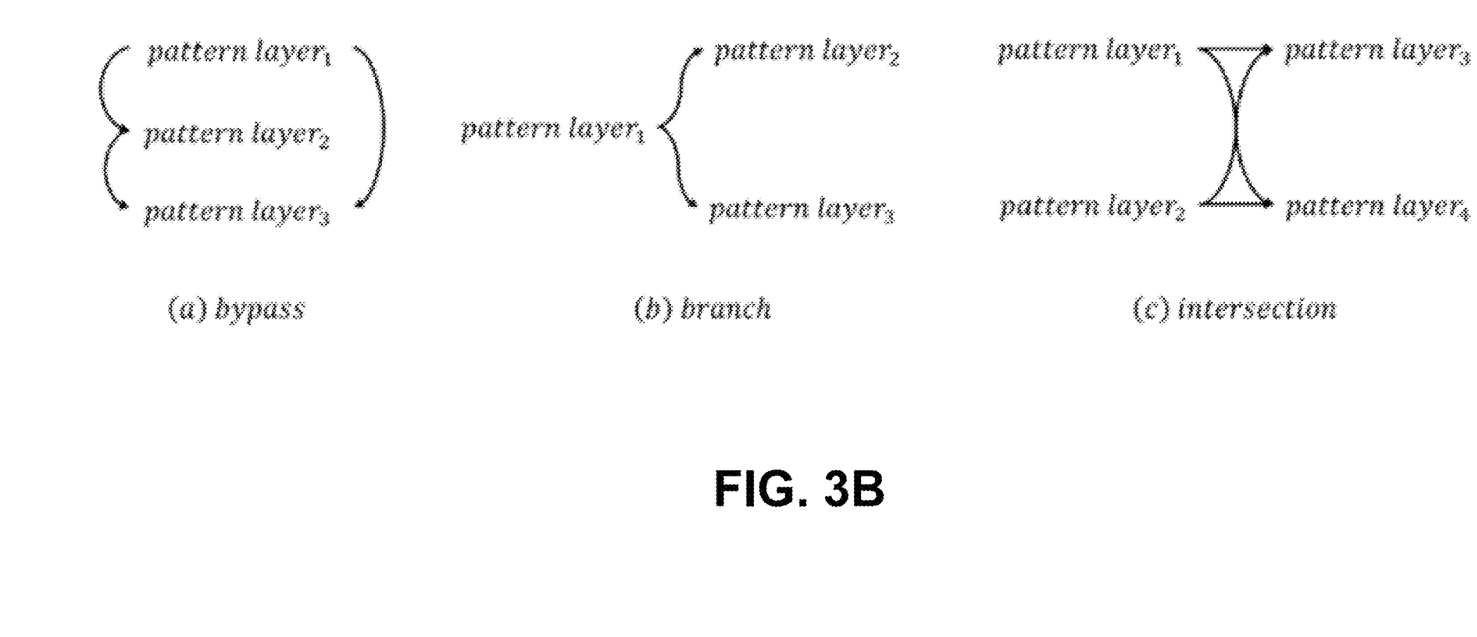
FIG. 3B depicts examples of nonlinear hierarchal structures associated with a context-free grammar, in accordance with some example embodiments.

To further illustrate, FIG. 3B depicts examples of nonlinear hierarchical structures associated with the context-free grammar G, in accordance with some example embodiments. As shown in FIG. 3B, the members of a first pattern layer $pattern layer_1$ may bypass the members a second pattern layer $pattern layer_2$ to connect with the members of a third pattern layer $pattern layer_3$. Alternatively and/or additionally, the members of the first pattern layer $pattern layer_1$ may branch in order to connect directly with the members the second pattern layer $pattern layer_2$ as well as the members of the third pattern layer $pattern layer_3$. Moreover, the members of the first pattern layer $pattern layer_1$ and second pattern layer $pattern layer_2$ may form an intersection by at least connecting with the members of the third pattern layer $pattern layer_3$ as well as the members of a fourth pattern layer $pattern layer_4$.

Figure 3C:
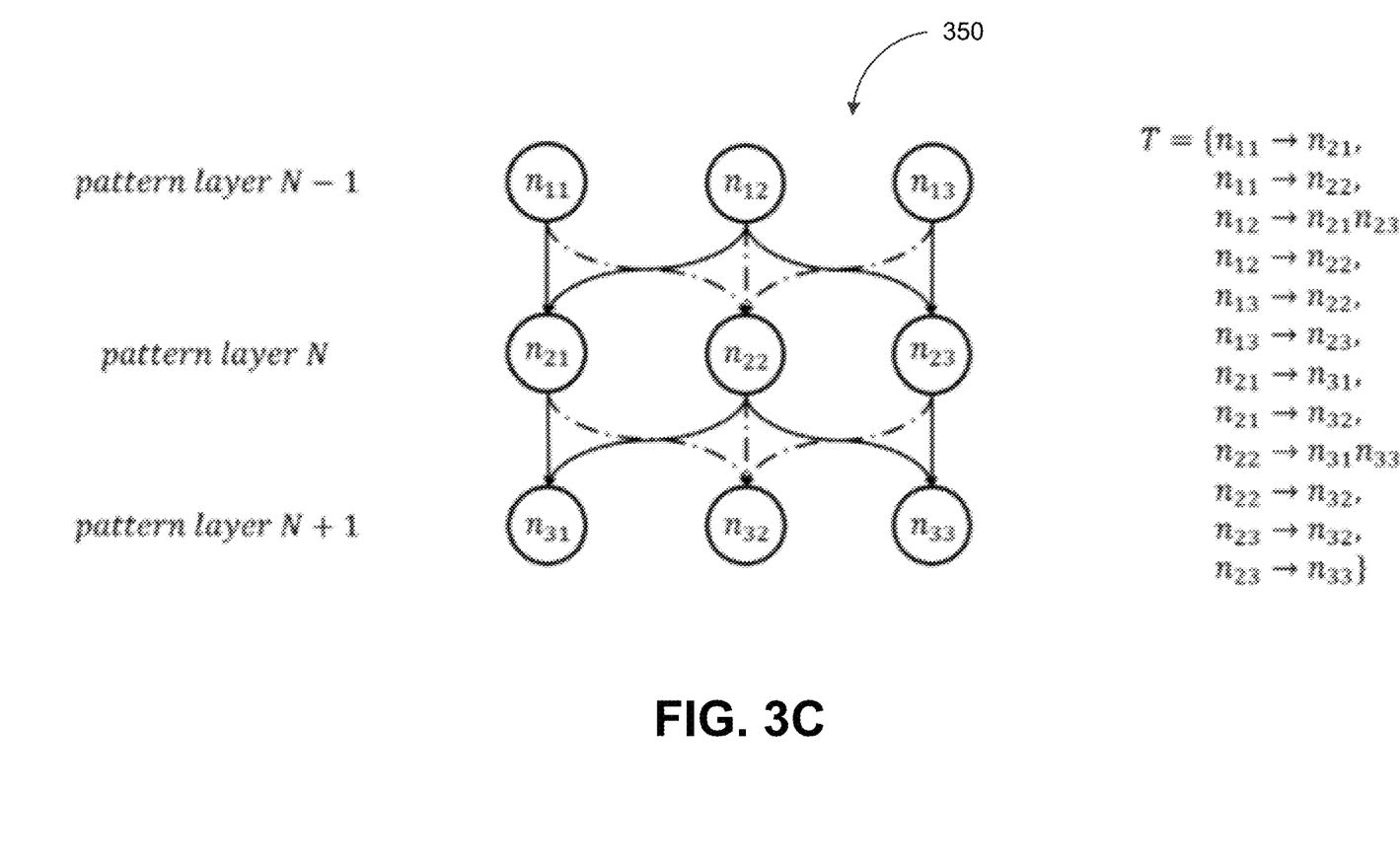
FIG. 3C depicts a topological graph illustrating examples of production rules forming a context-free grammar, in accordance with some example embodiments.

FIG. 3C depicts a topological graph 350 illustrating examples of production rules forming the context-free grammar G, in accordance with some example embodiments. In order to maximize the diversity and uniformity of the samples included in the corpus 115 generated based on the context-free grammar G, the machine learning controller 110 may define the context-free grammar G to maximize the interconnections between the nodes of the topological graph 350. Doing so may maximize the diversity of the corpus 115 because any single addition to the context-free grammar G may yield an exponential increase in the quantity of samples that may be generated based on the context-free grammar G. For example, the context-free grammar G may be defined such that each node in the topological graph 350 is associated with at least one incoming edge and/or outgoing edge corresponding to a production rule from the set of production rules T. That is, the machine learning controller 110 may define the context-free grammar G such that $\forall \alpha \in N$ satisfies Equation (2) below.

$$|\{\alpha \rightarrow b | b \in (N \cup \Sigma)^*, \alpha \rightarrow b \in T\}| > 1 \qquad (2)$$

Furthermore, the machine learning controller 110 may define the context-free grammar G such that $\forall b \in (N \cup \Sigma)$ satisfies Equation (3) below.

$$|\{\alpha \rightarrow wb'v | \alpha \in N, w, v \in (N \cup \Sigma)^*\}, \alpha \rightarrow b \in T| > 1 \qquad (3)$$

In practice, the distribution of samples generated based on the context-free grammar G to exhibit different patterns may vary. The set of probabilities P associated with each production rule in the set of production rules T may be expressed as Equation (4) below.

$$P = \{(\alpha \rightarrow b, p)\}, \alpha \rightarrow b \in T, p \in [0,1] \qquad (4)$$

The set of probabilities P may be further expressed as a distribution $P_{n_i}$ in accordance with Equation (5) below.

$$P_{n_i} = \{(n_i \rightarrow v_{i_1}, p_{i_1}), (n_i \rightarrow v_{i_2}, p_{i_2}), \ldots, (n_i \rightarrow v_{i_m}, p_{i_m})\},$$
$$n_i \in N, v_{i_j} \in (N \cup \Sigma)^*, p_{i_j} \in [0,1] \qquad (5)$$

wherein the sum of probabilities $\Sigma_{j=1}^m p_{i_j}$ for any one nonterminal symbol $n_i$ may be equal to 1.

Figure 4A:
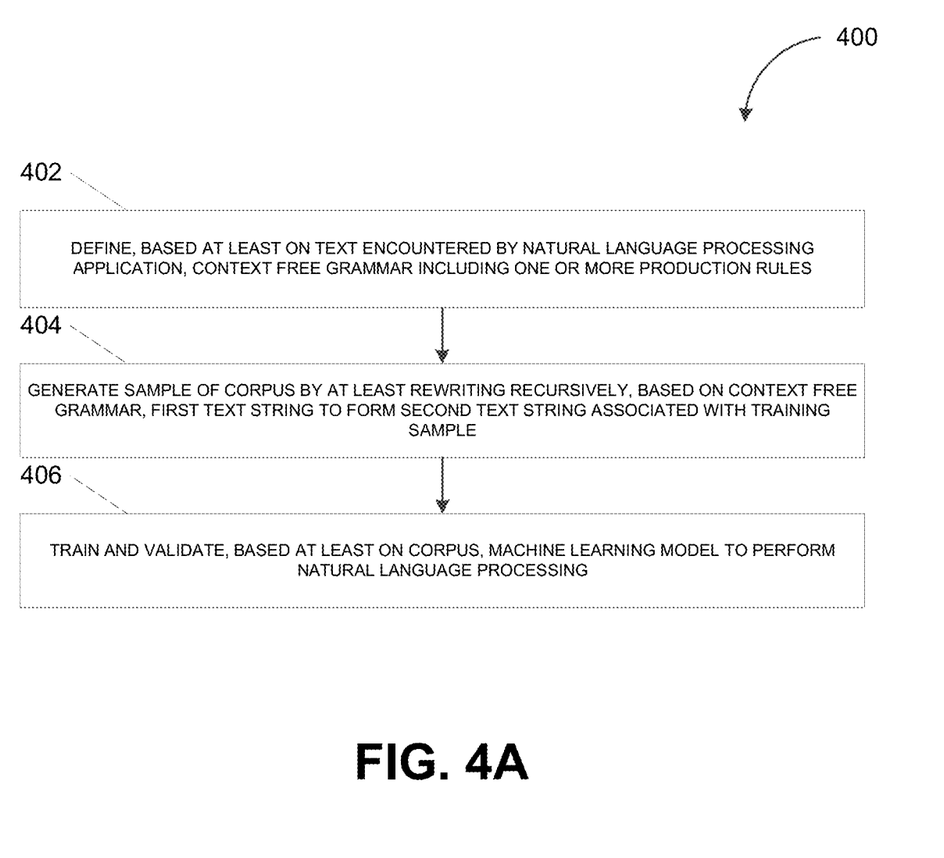
FIG. 4A depicts a flowchart illustrating a process for training a machine learning model, in accordance with some example embodiments.

FIG. 4A depicts a flowchart illustrating a process 400 for training a machine learning model, in accordance with some example embodiments. Referring to FIGS. 1-2, 3A-C, and 4A, the process 400 may be performed by the machine learning controller 110 in order to train the machine learning model 125 deployed as part of the natural language processing application 120.

At 402, the machine learning controller 110 may define, based at least on text encountered by a natural language processing application, a context-free grammar including one or more production rules. For example, the machine learning controller 110 ma define, based on text encountered by the natural language processing application 120, the context-free grammar G to include the set of production rules T. The context-free grammar G may be defined to be consistent with the grammar of the text encountered by the natural language processing application 120. Furthermore, the context-free grammar G may be defined to include the set of nonterminal symbols N, the set of terminal symbols $\Sigma$, and the start symbol S. In some example embodiments, each production rule in the set of production rules nonterminal symbols T may be applied to replace a nonterminal symbol from the nonterminal symbols N with one or more other nonterminal symbols from the set of nonterminal symbols N and/or terminal symbols from the set of terminal symbols $\Sigma$.

In some example embodiments, the machine learning controller 110 may define the context-free grammar G by at least generating, for example, the hierarchy 300 including the pattern layer 310a, the subpattern layer 310b, the padding layer 310c, the entity cluster layer 310d, the entity layer 310e, and the synonym layer 310f. The machine learning controller 110 may generate, based at least on the members of the pattern layer 310a, the subpattern layer 310b, and the entity cluster layer 310d of the hierarchy 300, the set of nonterminal symbols N. Moreover, the machine learning controller 110 may generate, based at least on the members of the padding layer 310c, the entity layer 310e, and the synonym layer 310f of the hierarchy 300, the set of terminal symbols $\Sigma$. The machine learning controller 110 may further generate, based at least on the directed edges connecting members occupying different layers of the hierarchy 300, the set of production rules T, each of which replacing a member occupying one layer of the hierarchy 300 with one or more members occupying another layer of the hierarchy 300.

At 404, the machine learning controller 110 may generate a sample of a corpus by at least rewriting recursively, based on the context-free grammar, a first text string to form a second text string associated with the sample. For example, the machine learning controller 110 may generate the corpus 115 to include one or more samples, each which including a text string generated based on the context-free grammar G. According to some example embodiments, the machine learning controller 110 may generate a sample by at least recursively rewriting a first text string to form a second text string. The first text string may include a sequence of nonterminal symbols. As such, the machine learning controller 110 may apply one or more production rules from the set of production rules T in order to rewrite the first text string by at least replacing one or more nonterminal symbols included in the first text string with other nonterminal symbols and/or terminal symbols until no nonterminal symbols remain in the first text string. The resulting second text string may include a sequence of terminal symbols, each of which being a word from the lexicon of the natural language.

The machine learning controller 110 may further generate the sample to include one or more ground-truth labels for the second text string associated with the sample. The one or more ground-truth labels may indicate, for example, a sentiment, a topic, and/or an intent associated with the second text string. In some example embodiments, the machine learning controller 110 may assign, based on the terminal symbols included in the second text string, the one or more ground-truth labels. For instance, the machine learning controller 110 may apply the mapping function $f$ configured to assign, to each terminal symbol $\epsilon \in \Sigma$ included in the second text string, a corresponding label from the label set A. As noted, the machine learning controller 110 may, to one or more terminal symbols included in the second text string that correspond to nonentities having no semantic significance, a "null" label. Moreover, the ground-truth labels included in the label set A may vary depending on the natural language processing application 120. For example, the label set A may include one or more different labels if the machine learning model 125 is deployed as part of a service ticket system to identify the issues reported to the service ticket system than if the machine learning model 125 is deployed as part of a document management system to categorize documents for storage.

At 406, the machine learning controller 110 may train, based at least on the corpus, a machine learning model to perform natural language processing. For example, the machine learning model controller 110 may train, based at least on the corpus 115, the machine learning model 125 to perform natural language processing. In some example embodiments, training the machine learning model 125 may include determining a gradient of an error function (e.g., mean squared error (MSE), cross entropy, and/or the like) associated with the machine learning model 125. Furthermore, training the machine learning model 125 may include adjusting one or more weights applied by the machine learning model 125 until the gradient of the error function converges to a threshold value (e.g., a local minimum and/or the like).

Figure 4B:
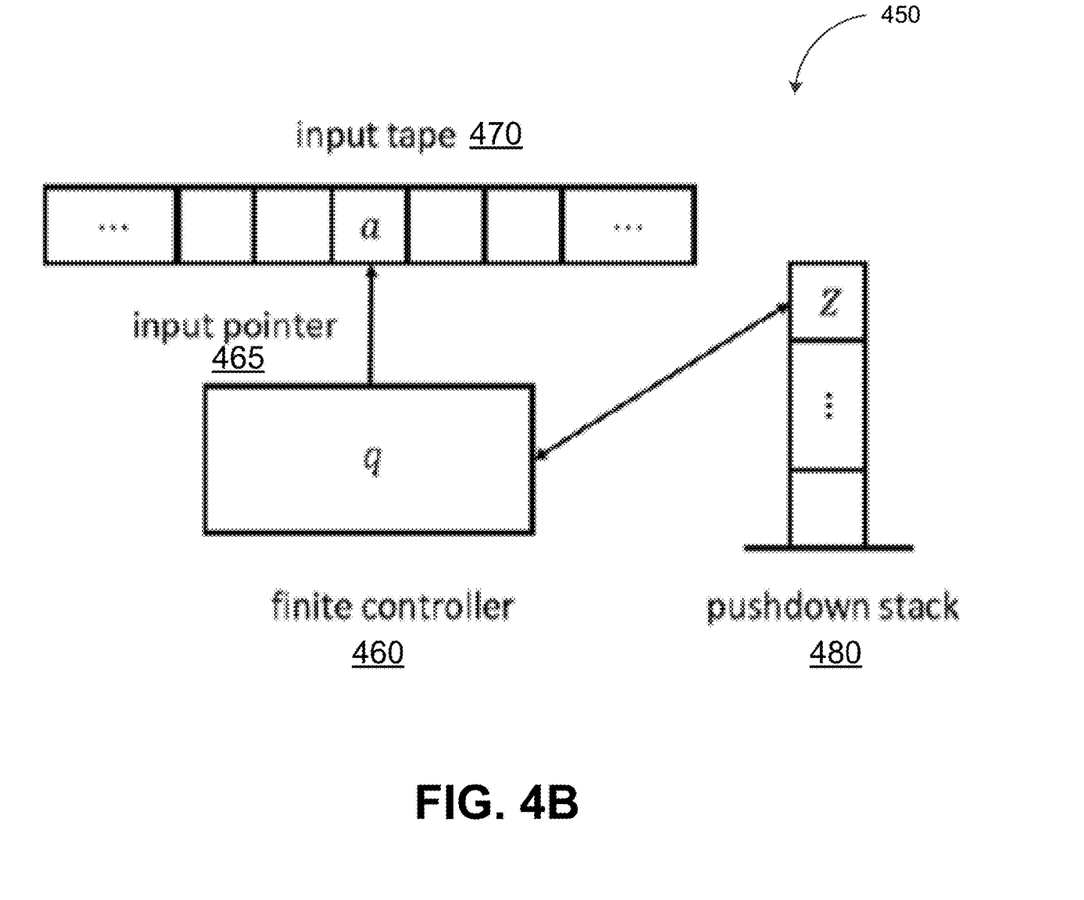
FIG. 4B depicts a block diagram illustrating a pushdown system for recursively rewriting a first text string to form a second text string, in accordance with some example embodiments.

FIG. 4B depicts a block diagram illustrating a pushdown system 450 for recursively rewriting a first text string to form a second text string, in accordance with some example embodiments. Referring to FIGS. 1 and 4B, the machine learning controller 110 may include the pushdown system 450, which may be configured to recursively rewrite the first text string to form the second text string by at least replacing, based on one or more production rules from the production rule set T, one or more nonterminal symbols included in the first text string with other nonterminal symbols and/or terminal symbols until no nonterminal symbols remain in the first text string. In the example of the pushdown system 450 shown in FIG. 4B, the finite controller 460 may receive the first text string via the input tape 470. Successive symbols from the input table 470 may be replaced and/or added to the pushdown stack 480.

As shown in FIG. 4B, the pushdown system 450 may include a finite controller 460, an input tape 470, and a pushdown stack 480. In some example embodiments, the finite controller 460 in status q may respond to accepting an input symbol a from the input tape 470 by at least transitioning to a new status $q_i$ (i=1,2, . . . , m) and replacing the symbol Z at the top of the pushdown stack 480 with a different symbol $\gamma_i$. Furthermore, the finite controller 460 may move the pointer 465 from the symbol α to a next symbol in the input tape 470. Upon processing the input tape 470 (e.g., when the pointer 465 is at an end of the input tape 470), the finite controller 460 may transition to another status $q_{i+1}$ and begin processing the pushdown stack 480 including by replacing one or more of the symbols in the pushdown stack 480 until no nonterminal symbols remain in the pushdown stack 480. The finite controller 460 may reach a terminal status $q_m$ when no nonterminal symbols remain in the pushdown stack 480.

In some example embodiments, the operations of the pushdown system 450 may be expressed as Equation (6) below.

$$M=(R, Q, \Gamma, \delta, q_0, Z_0, F) \quad (6)$$

wherein R may denote a finite set of alphabet present in the input table 470, Q may denote a finite set of status for the finite controller 460, Γ may denote a finite set of alphabet present in the pushdown stack 480, $q_0 \in Q$ may denote a start status of the finite controller 460, $Z_0 \in \Gamma$ may denote an initial symbol on the top of the pushdown stack 480, F 531 Q may denote a terminal status of the finite controller 460, and δ may denote a subset of status transitions from $Q \times (R \cup \{r\}) \times \Gamma^*$ to $Q \times \Gamma^*$ such that $\delta(q, a, Z) = \{(q_1, \gamma_1), (q_2, \gamma_2), \ldots, (q_m, \gamma_m)\}$ where $q_1, q_2, \ldots, q_m \in Q$, $\alpha \in R$, $Z \in \Gamma$, $\gamma_1, \gamma_2, \ldots, \gamma_m \in \Gamma^*$.

Figure 5:
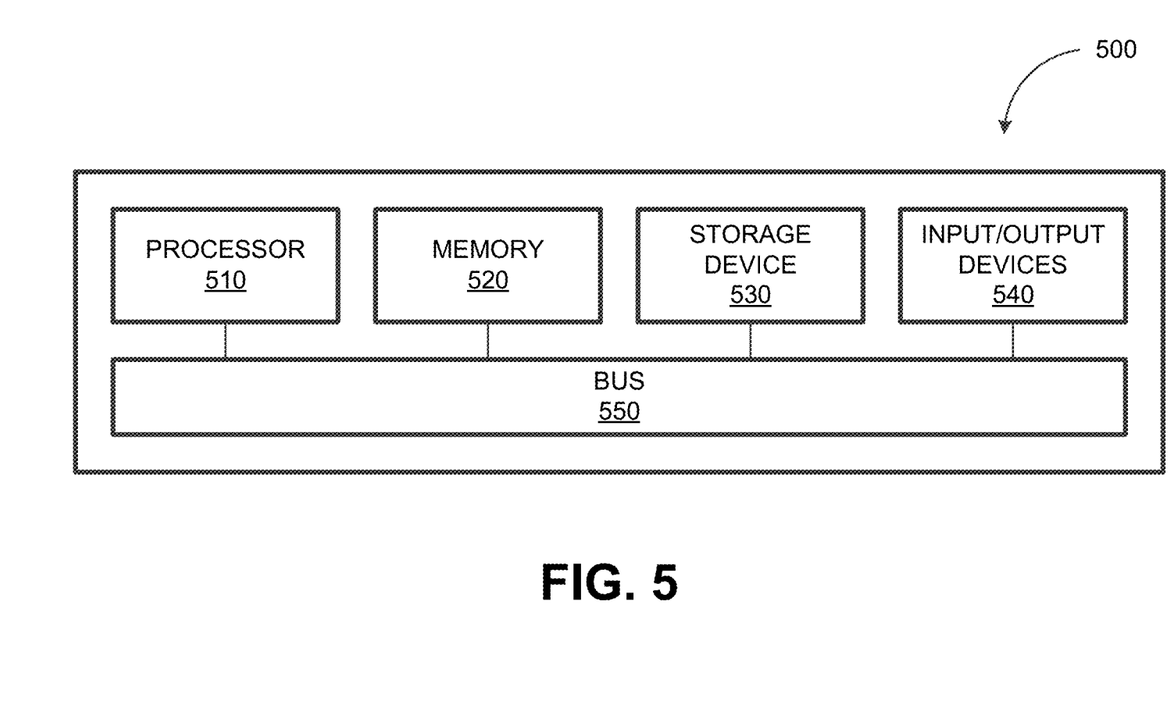
FIG. 5 depicts a block diagram illustrating a computing system, in accordance with some example embodiments.

FIG. 5 depicts a block diagram illustrating a computing system 500, in accordance with some example embodiments. Referring to FIGS. 1 and 5, the computing system 500 can be used to implement the machine learning controller 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the machine learning controller 110. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
    at least one data processor; and
    at least one memory storing instructions which, when executed by the at least one data processor, result in operations comprising:
        generating, based at least on a context-free grammar, a sample forming a corpus, the context-free grammar including one or more production rules for replacing a first nonterminal symbol with a second nonterminal symbol and/or a terminal symbol, the sample being generated by at least rewriting recursively a first text string to form a second text string associated with the sample and assigning, to the sample, a ground-truth label for the second text string, and the first text string being rewritten by at least applying the one or more production rules to replace one or more nonterminal symbols included in the first text string until no nonterminal symbols remain in the first text string; and
        training and validating, based at least on the corpus, a machine learning model to process a natural language.

2. The system of claim 1, wherein the context-free grammar includes a first production rule for replacing the first nonterminal symbol with at least the second nonterminal symbol, and wherein the context-free grammar further includes a second production rule for replacing the second nonterminal symbol with at least the terminal symbol.

3. The system of claim 2, wherein the first text string is rewritten recursively by at least applying the first production rule to replace the first nonterminal symbol included in the first text string with the second nonterminal symbol before applying the second production rule to replace the second nonterminal symbol with the terminal symbol.

4. The system of claim 1, wherein the ground-truth label indicates a sentiment, a topic, and/or an intent associated with the second text string.

5. The system of claim 1, wherein the ground-truth label is associated with a first value based on the terminal symbol being an entity having a semantic significance, and wherein the ground-truth label is associated with a second value based on the terminal symbol being a nonentity having no semantic significance.

6. The system of claim 1, wherein the ground-truth label is associated with a value corresponding to an application of the machine learning model trained to process the natural language.

7. The system of claim 1, wherein the machine learning model is trained by at least adjusting one or more weights applied by the machine learning model to at least minimize an error in an output of the machine learning model, and wherein the error in the output of the machine learning model corresponds to a difference between the ground-truth label assigned to the sample and a label assigned to the sample by the machine learning model.

8. The system of claim 1, wherein the machine learning model is validated based at least on the machine learning model assigning, to the sample, a label matching the ground-truth label associated with the sample.

9. The system of claim 1, further comprising:
defining, based at least on a text associated with the natural language, the context-free grammar, the context-free grammar being defined by at least determining a hierarchy, the hierarchy including a first plurality of layers having a first plurality of members forming a first set of nonterminal symbols including the first nonterminal symbol and the second nonterminal symbol, and the hierarchy further including a second plurality of layers having a second plurality of members forming a second set of terminal symbols including the terminal symbol.

10. The system of claim 9, wherein the context-free grammar is defined by at least determining, based at least on one or more directed edges interconnecting the first plurality of members and the second plurality of members, the one or more production rules.

11. The system of claim 9, wherein the context-free grammar is defined by at least determining, based at least on the first plurality of members, the first set of nonterminal symbols, and wherein the context-free grammar is further defined by at least determining, based at least on the second plurality of members, the second set of terminal symbols.

12. The system of claim 9, wherein the first plurality of layers include a pattern layer including a pattern present in the text and an entity cluster layer including a cluster of a first entity and a second entity present in the subpattern.

13. The system of claim 12, wherein the second plurality of layers include a padding layer including a nonentity present in the subpattern, an entity layer including the first entity and the second entity, and a synonym layer including a synonym associated with the first entity and/or the second entity.

14. The system of claim 1, wherein the machine learning model comprises a neural network, a Bayesian network, a Markov chain, and/or a support vector machine.

15. The system of claim 1, wherein each of the first nonterminal symbol and the second nonterminal symbol denote a noun phrase, a verb phrase, an adjective phrase, an adverb phrase, a Gerund phrase, an infinitive phrase, an absolute phrase, a determiner, a conjunction, a verb, a noun, a pronoun, an adjective, an adverb, a preposition, or an interjection.

16. The system of claim 1, wherein the terminal symbol denotes a word in a lexicon associated with the natural language.

17. The system of claim 1, wherein the sample is part of a training dataset or a validation dataset forming the corpus.

18. A computer-implemented method, comprising:

generating, based at least on a context-free grammar, a sample forming a corpus, the context-free grammar including one or more production rules for replacing a first nonterminal symbol with a second nonterminal symbol and/or a terminal symbol, the sample being generated by at least rewriting recursively a first text string to form a second text string associated with the sample and assigning, to the sample, a ground-truth label for the second text string, and the first text string being rewritten by at least applying the one or more production rules to replace one or more nonterminal symbols included in the first text string until no nonterminal symbols remain in the first text string; and training and validating, based at least on the corpus, a machine learning model to process a natural language.

19. A non-transitory compute readable medium storing instructions, which when executed by at least one data processor, result in operations comprising:

generating, based at least on a context-free grammar, a sample forming a corpus, the context-free grammar including one or more production rules for replacing a first nonterminal symbol with a second nonterminal symbol and/or a terminal symbol, the sample being generated by at least rewriting recursively a first text string to form a second text string associated with the sample and assigning, to the sample, a ground-truth label for the second text string, and the first text string being rewritten by at least applying the one or more production rules to replace one or more nonterminal symbols included in the first text string until no nonterminal symbols remain in the first text string; and training and validating, based at least on the corpus, a machine learning model to process a natural language.

* * * * *